United States Patent [19]

Schricker

[11] Patent Number: 5,604,306
[45] Date of Patent: Feb. 18, 1997

[54] APPARATUS AND METHOD FOR DETECTING A PLUGGED AIR FILTER ON AN ENGINE

[75] Inventor: David R. Schricker, Dunlap, Ill.

[73] Assignee: Caterpillar Inc., Peoria, Ill.

[21] Appl. No.: 508,649

[22] Filed: Jul. 28, 1995

[51] Int. Cl.$^6$ .................................................. G01M 15/00
[52] U.S. Cl. ................................ 73/118.2; 116/DIG. 25; 340/607
[58] Field of Search .......................... 73/38, 117.2, 118.1, 73/118.2, 202.5; 116/DIG. 25; 340/607

[56] References Cited

U.S. PATENT DOCUMENTS

| | | | |
|---|---|---|---|
| 3,721,120 | 3/1973 | Howell et al. | 73/117.3 |
| 4,254,731 | 3/1981 | Taylor | 73/709 |
| 4,368,705 | 1/1983 | Stevenson et al. | 123/357 |
| 4,369,728 | 1/1983 | Nelson | 116/276 |
| 4,445,456 | 5/1984 | Nelson | 116/268 |
| 4,604,701 | 8/1986 | Fujawa et al. | 364/431.01 |
| 4,616,616 | 10/1986 | Staniak et al. | 123/357 |
| 4,621,335 | 11/1986 | Bluish et al. | 364/550 |
| 4,630,189 | 12/1986 | Ohmori et al. | 364/150 |
| 4,671,107 | 6/1987 | Chiesa et al. | 73/118.2 |
| 4,736,715 | 4/1988 | Larsen | 123/64 |
| 4,882,905 | 11/1989 | Kawamura | 60/608 |
| 4,901,530 | 2/1990 | Kawamura | 60/608 |
| 4,953,110 | 8/1990 | Chartrand | 364/431.03 |
| 4,964,318 | 10/1990 | Ganoung | 74/859 |
| 5,010,487 | 4/1991 | Stonehocker | 364/424.03 |
| 5,205,125 | 4/1993 | Potter | 60/602 |
| 5,377,112 | 12/1994 | Brown, Jr. et al. | 364/431.12 |
| 5,401,285 | 3/1995 | Gillingham et al. | 55/284 |

FOREIGN PATENT DOCUMENTS

| | | |
|---|---|---|
| 0142101 | 5/1985 | European Pat. Off. . |
| 0231155 | 8/1987 | European Pat. Off. . |

Primary Examiner—Richard Chilcot
Assistant Examiner—Eric S. McCall
Attorney, Agent, or Firm—James R. Yee

[57] ABSTRACT

An apparatus and method for detecting a plugged condition of an air filter uses a computer based model of the air restriction.

12 Claims, 4 Drawing Sheets 5,604,306

APPARATUS AND METHOD FOR DETECTING A PLUGGED AIR FILTER ON AN ENGINE

TECHNICAL FIELD

This invention relates generally to an apparatus and method for detecting a plugged air filter on an engine, and more particularly to an apparatus and method for detecting a plugged air filter on an engine using a computer based model.

BACKGROUND ART

Proper maintenance of a vehicle's engine is an important priority in the daily operation of a vehicle. Without proper maintenance minor problems can escalate into major mechanical failures, resulting in costly downtime and expensive repairs.

For example, the condition of the air filter is one such characteristic of the engine which is desirable to be known. One way to determine the condition of the air filter is to physically inspect the air filter. However, this is usually done at intervals. It is desirable to have a continuous status of the air filter.

One such method designed to determine the condition of the air filter is to install pressure sensors on either side of the air filter. By comparing the pressure readings, a plugged air filter condition may be detected. The engine may already be equipped with a pressure sensor to detect intake manifold pressure to be used in controlling the engine and/or performing other diagnostics. However, the installation of the second pressure sensor is cost prohibitive. Thus, it is desirable to provide an indication of a plugged air filter using a minimal number of sensors.

The subject invention is directed at overcoming one or more of the problems as set forth above.

DISCLOSURE OF THE INVENTION

In one aspect of the present invention, an apparatus for detecting a plugged air filter on an engine is provided. The engine includes an intake manifold. The apparatus senses the intake manifold pressure and temperature and determines an estimate of the air restriction. A plugged condition is detected as a function of the air restriction.

In another aspect of the present invention, a method for detecting a plugged air filter on an engine is provided. The method includes the steps of sensing intake manifold pressure and temperature and estimating the air restriction. A plugged condition is detected as a function of the air restriction estimate.

BEST MODE FOR CARRY OUT THE INVENTION

Figure 1:
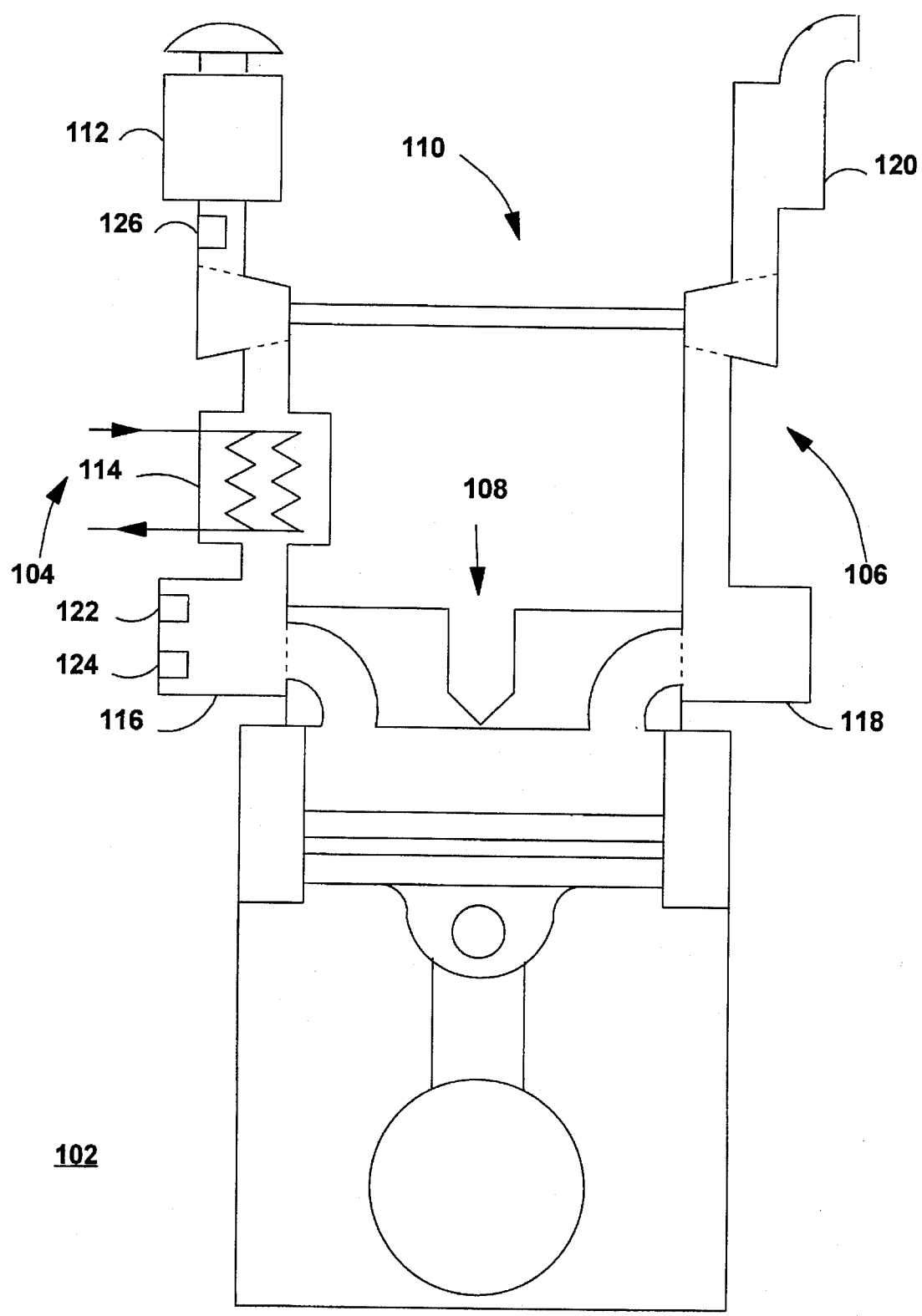
FIG. 1 is a stylized representation of an engine having a combustion system, an air intake system and an exhaust system.

With reference to FIG. 1, the present invention is adapted for use with an engine 102. As shown in the stylized representation of the engine 102, the engine includes an air intake system 104, an exhaust system 106, a combustion system 108, and a turbocharger 110. The air intake system 104 includes an air filter or cleaner 112, an aftercooler 114, and an air intake manifold 116. The exhaust system 106 includes an exhaust manifold 118 and a muffler 120.

Figure 2:
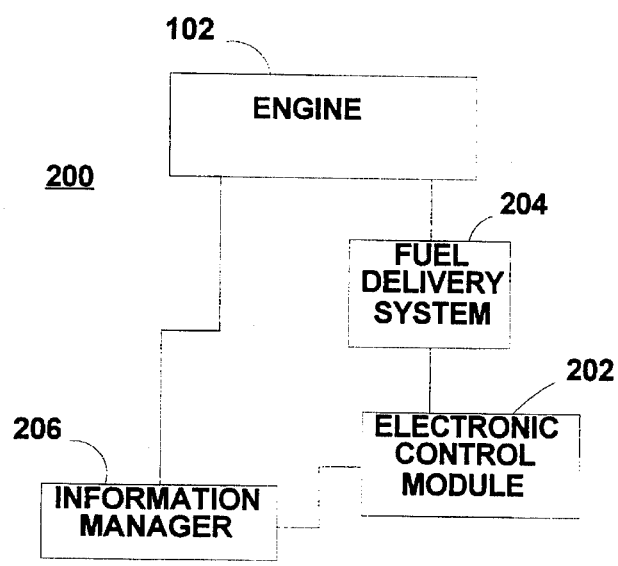
FIG. 2 is a block diagram of an apparatus for detecting a plugged air filter in the engine of FIG. 1, according to an embodiment of the present invention.

With reference to FIG. 2, the present invention or apparatus 200 is adapted to detect a plugged condition of the air filter 112. Typically, the engine 102 is controlled by an electronic control module (ECM) 202. The ECM 202 includes a fuel delivery system 204. Typically, the fuel delivery system 204 includes a fuel injection system or a electronic governor. The electronic governor 204 controls the amount of fuel delivered to the engine.

An information manager 206 receives information from the ECM 202 and directly from sensors connected to the engine 102, stores the information and performs diagnostics of the engine using the sensor information.

Preferably, the ECM 202 and the information manager 206 are microprocessor controlled. In an alternate embodiment, the functions performed by the information manager 206 are performed by the ECM 202. In the preferred embodiment, the apparatus 200 is embodied in software in the information manager 206.

Referring to FIGS. 1 and 2, the information manager 206 receives information from an intake manifold pressure (boost pressure) sensor 122, an intake manifold temperature sensor 124, and a filtered air pressure sensor 126.

The ECM 202 may also transmit other sensor information and other calculated engine parameters to the information manager 206. For example, the ECM 202 calculates the mass flow rate of fuel into the engine 102 as a function of engine speed (measured) and rack position or RACK. Note that the term RACK is used for historic purposes only. In engines controlled by an ECM, there is physically no rack. However the term, rack position (RACK) has been retained to refer to the amount of fuel delivered to the engine 102. The ECM 202 relays this information to the information manager 206. In the preferred embodiment, the ECM 202 also receives sensor information relating to engine speed, timing advance, and rack position or fuel rate and relays this information to the information manager 206.

In one embodiment, the information manager 206 performs diagnostic routines including the detection of a plugged air filter on board the vehicle. In a second embodiment, the information manager 206 records or stores the sensor information in a memory for download into an external computer for analysis. In a third embodiment, the information manager 206 includes a transmitter (not shown) for transmitting the data to a remote site for processing. A satellite system receives the signals from the transmitter and relays the signals to the remote cite. One suitable transmitter is the Omnitracs Mobile Messaging Communications Terminal. A suitable satellite system service is Omnitracs Message Service. Both are available from Qualcomm of San Diego, Calif.

The information manager 206 receives information from the available sensors and the ECM 202 and detects a plugged air filter 128.

Figure 3:
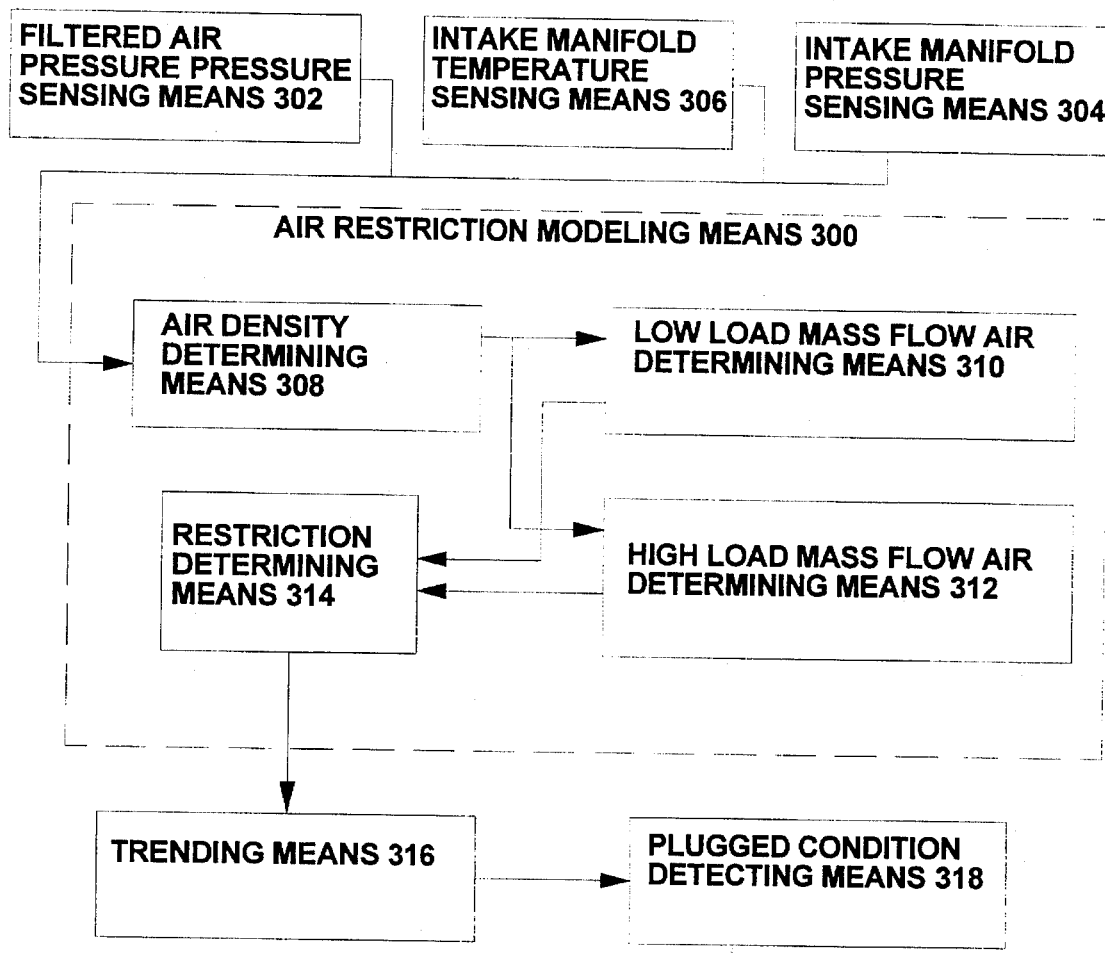
FIG. 3 is a flow diagram illustrating operation of the apparatus of FIG. 2, according to an embodiment of the present invention.

With reference to FIG. 3, the apparatus 200 is described below. An air restriction modeling means 300 receives uses certain sensor information and determines a modeled pressure differential across the air filter 128.

A means 302 senses filtered air pressure and responsively produces a filtered air pressure sensor. The filtered air pressure sensing means 302 includes the filtered air pressure sensor 126.

A means 304 senses the intake manifold pressure and responsively produces an intake manifold pressure signal. The intake manifold pressure signal producing means 304 includes the intake pressure sensor 122.

A means 306 senses intake manifold temperature and responsively producing an intake manifold temperature signal. The intake manifold temperature signal producing means 306 includes the intake pressure sensor 124.

In the preferred embodiment, the air restriction modeling means 300 includes:

- a means 308 for receiving the intake manifold pressure and temperature signals, responsively determining a density of air at the intake manifold, and producing an air density signal;
- a means 310 for detecting a low load condition of the engine 102, receiving the air density signal, responsively determining a mass flow of air through the engine 102 at the low load condition and producing a low load mass flow air signal;
- a means 312 for detecting a high load condition of the engine 102, receiving the air density signal, responsively determining a mass flow of air through the engine 102 at the high load condition and producing a high load mass flow air signal; and,
- a means 314 for receiving the low load and high load condition mass air flow signals, responsively determining a restriction value, and responsively producing a restriction signal.

A trending means 316 captures the restriction signal and stores said restriction signal over time.

A means 318 receives the restriction signal and responsively detects a plugged condition of the air filter.

Figure 4:
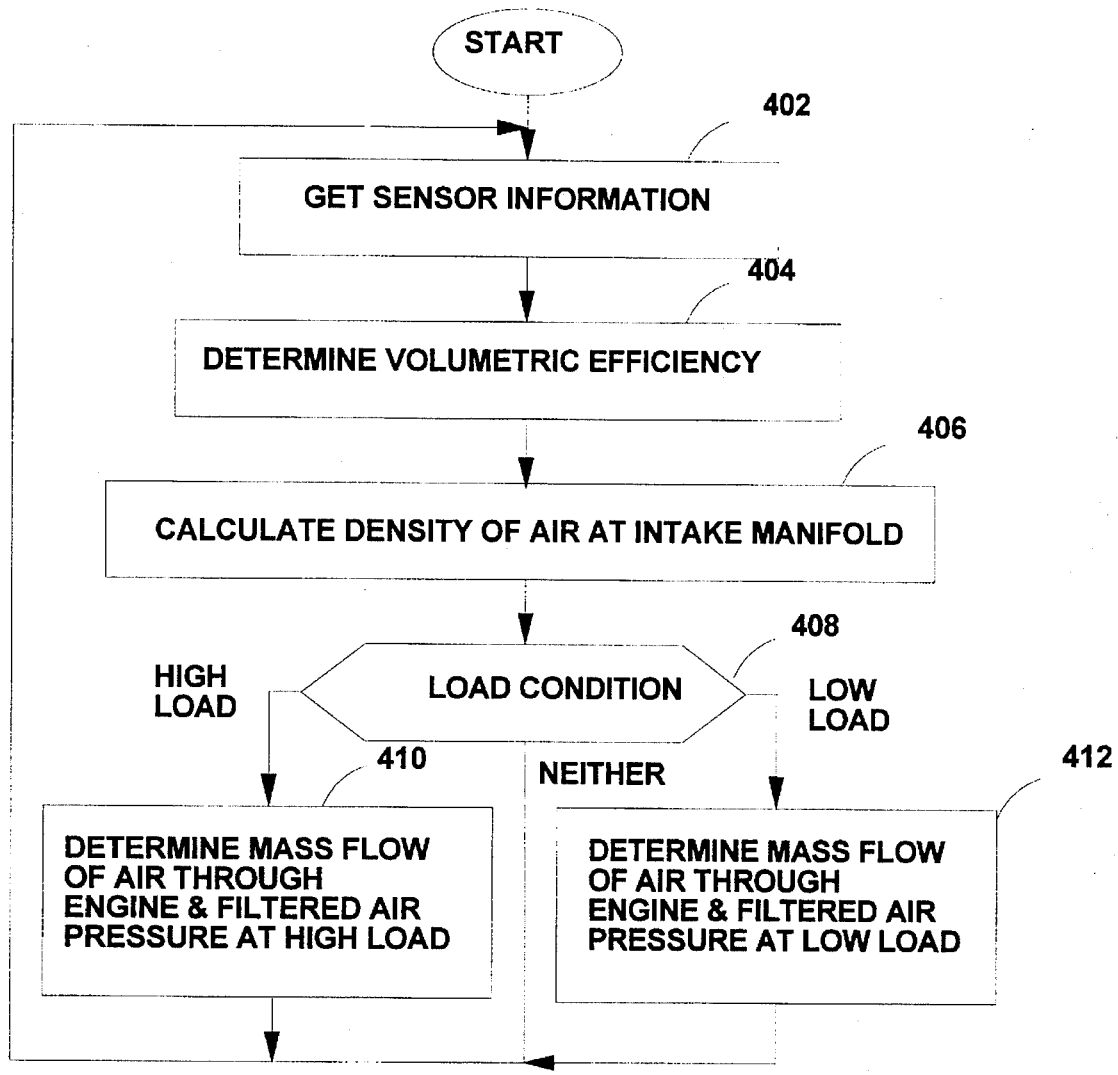
FIG. 4 is a flow diagram illustrating a portion of the operation of the apparatus of FIG. 2, according to an embodiment of the present invention; and, FIG. 5 is a flow diagram illustrating a second portion of the apparatus of FIG. 2, according to an embodiment of the present invention.

With reference to FIG. 4, the operation of the apparatus 200 will be discussed. In a first control block 402, the sensor data is read. In the preferred embodiment, the air flow model uses the following engine information:

| | |
|---|---|
| engine speed | (SPEED), |
| rack position/fuel rate | (RACK), and |
| intake manifold temperature | ($T_{intake}$) |
| intake manifold pressure | ($P_{intake}$). |

In a second control block 404, the volumetric efficiency of the engine 102 is calculated. The volumetric efficiency ($VOL_{13}$ EFF) is the mass flow efficiency of the engine 102 as it acts as a positive displacement pump. In the preferred embodiment, the volumetric efficiency of the engine 102 is obtained from an engine performance map. The engine performance map is determined experimentally and the volumetric efficiency is determined as a function of the rack position and the engine speed from the electronic control module 202.

In a third control block 406, the density of the air at the intake manifold is calculated. The density of the air is determined by:

$$d_{air} = P_{intake}/(R_{air} * T_{intake}) \quad \text{EQU. 1}$$

where $R_{air}$ is the gas constant for air.

In a fourth control block 408, the load condition of the engine is detected. In the preferred embodiment, a low load condition of the engine is defined by an engine speed between SPEED1 and SPEED2 and a RACK<RACK1. The engine speed and rack values which are used to define the low load condition will be dependent upon the engine. One typical example is a SPEED1 of 1400 rpm, a SPEED2 of 1900 rpm, and a RACK1 of 4.5 mm. A high load condition of the engine is defined by an engine speed between SPEED1 and SPEED2 and a RACK>RACK2. A typical example is a RACK2 of 7.5 mm.

If a high load condition exists, control proceeds to a fifth control block 410. In the fifth control block 410, the mass flow of air through the engine at high load is determined, using the density of air calculated in EQU. 1, by the equation:

$$MASS\_AIR_{high} = VOL\_EFF * D_{air} * VOL\_FL\_RT \quad \text{EQU. 2A}$$

where VOL_FL_RT is the volumetric pumping of the engine and is determined by:

$$VOL\_FL\_RT = \frac{DISPLACEMENT * SPEED * 1 \text{ pump cycle}}{2 \text{ engine rev's}} \quad \text{EQU. 3}$$

where DISPLACEMENT is the total displacement of the engine and SPEED is the engine speed.

IF a low load condition exists, control proceeds to a sixth control block 412. In the sixth control block 412, the mass flow of air through the engine at low load is determined, using the density of air calculated in EQU. 1, by the equation:

$$MASS\_AIR_{low} = VOL\_EFF * D_{air} * VOL\_FL\_RT \quad \text{EQU. 2B.}$$

Figure 5:
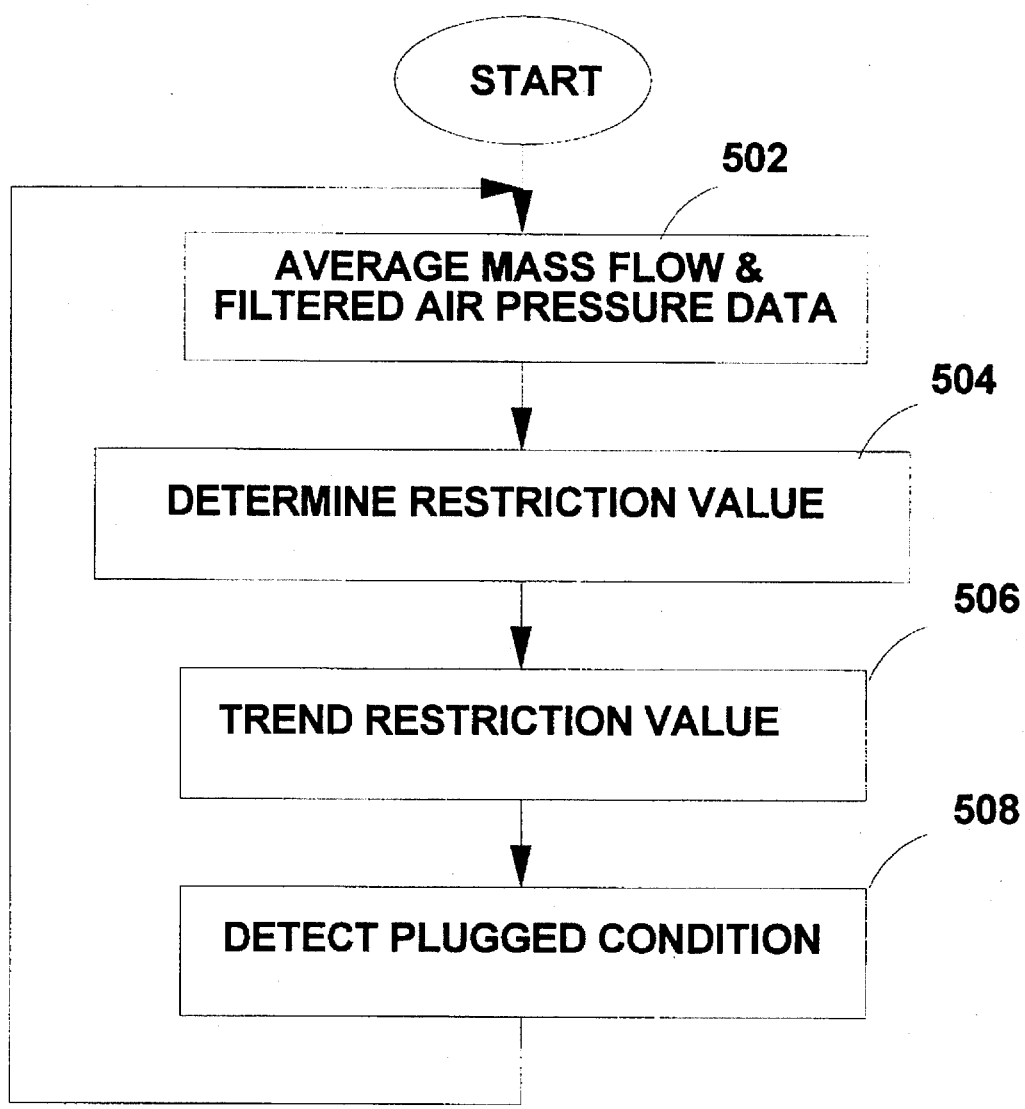

With reference to FIG. 5 the operation of the apparatus to detect the plugged condition, uses filtered and averaged data. Data is received at regular intervals, e.g., every tenth of a second or every second. In a seventh control block 502, the data is then averaged over a set time period, for example, five minutes or one hour. In other words, a single averaged mass flow air value is determined for high loads on the engine and a single averaged mass flow air value is determined for low loads every time period.

In an eighth control block 504, a restriction value is determined based on the mass flow air average values. In the preferred embodiment, the pressure drop across the filter is assumed to be proportional to the square of airflow and atmospheric pressure is assumed to be constant over the time period. Using these assumptions, the system can be described using two equations with two unknowns:

$$P_{atm} - Pin_{low} = K * (MASS\_AIR_{low})^2 \quad \text{EQU.4}$$

$$P_{atm} - Pin_{high} = K * (MASS\_AIR_{high})^2 \quad \text{EQU. 5,}$$

where, $P_{atm}$ is atmospheric pressure, $Pin_{low}$ and $Pin_{high}$ are the averaged measured filtered air pressures at low and high load, respectively, and K is a measure of air filter restriction. It should also be noted that because of the assumption of constant atmospheric pressure if no new data is included in a time period, the Pin and MASS_AIR values are purged.

Thus in the preferred embodiment, the restriction of the air filter can be measured by the equation:

$$K = \frac{Pin_{low} - Pin_{high}}{(MASS\_AIR_{high})^2 - (MASS\_AIR_{low})^2} \quad \text{EQU. 6}$$

In the preferred embodiment, the restriction value is normalized at rated engine conditions. The normalized restriction values is determined by:

$$K_{normalized} = K*(AIRFLOW_{rated})^2,$$

where $AIRFLOW_{rated}$ is the airflow at rated engine conditions. A typical airflow at rated engine conditions is 0.5 kg/s.

In a ninth control block 506, the normalized restriction values, $K_{normaized}$, are stored and trended over time. Trending refers to the process where the data is plotted over time and analyzed for indications that the filter is plugged. First, the data may be filtered to remove biasing by removing the steady state component. Then, the data may be plotted on paper by a printer or plotter or may be displayed on a viewscreen.

In a tenth control block 508, a plugged air filter is detected. A plugged air filter may be detected in several ways. First, a plugged air filter may be detected by comparing the normalized restriction, $K_{normalized}$, with a preset constant. A plugged air filter is said to have occurred when the normalized restriction exceeds the preset constant. Additionally, a plugged condition may be said to occur when other patterns occur in the normalized restriction values. For example, a plugged condition may be defined where the normalized restriction value rises at a preset rate over a predetermined time period. Lastly, either of the two definitions used to detect a plugged condition may be tied to the occurrence of other conditions of the engine.

Industrial Applicability

With reference to the drawings and in operation, the present invention or apparatus 200 is adapted to detect a plugged air filter 112 in an engine 102. The apparatus is embodied in a computer program. Ideally, the present invention is run on an on-board computer for real-time detection of a plugged condition. However, the present invention may be run on off-loaded or downloaded data.

The apparatus receive sensor information from a plurality of sensors and/or from other modules.

As described above, the sensor information is used to detect a plugged condition of the air filter 112 using a computer model of the air restriction.

Other aspects, objects, and advantages of this invention can be obtained from a study of the drawings, the disclosure, and the appended claims.

I claim:

1. An apparatus for detecting a plugged air filter on an engine having an intake manifold, including:

means for sensing filtered air pressure and responsively producing a filtered air pressure signal;

means for sensing intake manifold pressure and responsively producing an intake manifold pressure signal;

means for sensing intake manifold temperature and responsively producing an intake manifold temperature signal;

means for receiving said intake manifold pressure and temperature signals, responsively determining a density of air at the intake manifold, and producing an air density signal;

means for detecting a low load condition of the engine, receiving said air density signal, responsively determining a mass flow of air through the engine at said low load condition and producing a low load mass flow air signal;

means for detecting a high load condition of the engine, receiving said air density signal, responsively determining a mass flow of air through the engine at said high load condition and producing a high load mass flow air signal;

means for receiving said low load and high load condition mass air flow signals and said filtered air pressure signal, responsively determining a restriction value, and responsively producing a restriction signal; and means for receiving said restriction signal and responsively detecting a plugged condition of the air filter.

2. An apparatus, as set forth in claim 1, wherein said restriction signal producing means includes means for determining a low load filtered air pressure and a high load filtered air pressure at said low load and high load conditions, respectively, and wherein said restriction value is a function of said low load filtered air pressure and high load filtered air pressure.

3. An apparatus, as set forth in claim 1, wherein said detecting means includes means for capturing said restriction signal and storing said restriction signal over time.

4. An apparatus, as set forth in claim 2, wherein said stored restriction signal is filtered.

5. An apparatus, as set forth in claim 2, wherein said detecting means includes means for comparing said captured restriction signal to a preset value and wherein said plugged condition being defined by said preset value.

6. An apparatus, as set forth in claim 2, wherein said plugged condition is defined by a predetermined trend, said plugged condition being detected by comparing said predetermined trend to said stored restriction signals.

7. A method for detecting a plugged air filter on an engine having an intake manifold, including the steps of:

sensing filtered air pressure and responsively producing a filtered air pressure signal;

sensing intake manifold pressure and responsively producing an intake manifold pressure signal;

sensing intake manifold temperature and responsively producing an intake manifold temperature signal;

receiving said intake manifold pressure and temperature signals, responsively determining a density of air at the intake manifold, and producing an air density signal;

detecting a low load condition of the engine, receiving said air density signal, responsively determining a mass flow of air through the engine at said low load condition and producing a low load mass flow air signal;

detecting a high load condition of the engine, receiving said air density signal, responsively determining a mass flow of air through the engine at said high load condition and producing a high load mass flow air signal;

receiving said low load and high load condition mass air flow signals and said filtered air pressure signal, responsively determining a restriction value, and responsively producing a restriction signal; and receiving said restriction signal and responsively detecting a plugged condition of the air filter.

8. A method, as set forth in claim 7, including the steps of:

determining a low load filtered air pressure at said low load condition, and determining a high load filtered air pressure at said high load condition;

and wherein said restriction signal is a function of said low load and high load condition mass air flow signals and said low load and high load condition filtered air pressures.

9. A method, as set forth in claim 7, wherein said step of detecting includes the step of storing said restriction signal over time.

10. A method as set forth in claim 7, including the step of filtering said restriction signal.

11. A method, as set forth in claim 7, wherein said detecting step includes the of for comparing said captured restriction signal to a preset value, wherein said plugged condition being defined by said preset value.

12. A method, as set forth in claim 7, wherein said plugged condition is defined by a predetermined trend, and including the step of comparing said predetermined trend to said stored restriction signals.

* * * * *